United States Patent [19]
Koelpin et al.

[11] Patent Number: 4,914,951
[45] Date of Patent: Apr. 10, 1990

[54] APPARATUS FOR REMOTE DISTANCE MEASUREMENT

[75] Inventors: Thomas Koelpin, Amberg; Alfred Forster, Schwandorf, both of Fed. Rep. of Germany

[73] Assignee: Siemens Aktiengesellschaft, Berlin and Munich, Fed. Rep. of Germany

[21] Appl. No.: 282,441

[22] Filed: Dec. 9, 1988

[30] Foreign Application Priority Data

Dec. 11, 1987 [DE] Fed. Rep. of Germany ....... 3742137

[51] Int. Cl.$^4$ ............................................. G01N 29/00
[52] U.S. Cl. ........................................ 73/597; 367/903
[58] Field of Search ................ 73/597, 609, 620, 627, 73/290 V; 310/317, 316; 367/903

[56] References Cited

U.S. PATENT DOCUMENTS

| | | | |
|---|---|---|---|
| 4,156,823 | 5/1979 | Suzuki | 310/317 |
| 4,597,068 | 6/1986 | Miller | 367/903 |
| 4,701,893 | 10/1987 | Muller et al. | 367/903 |
| 4,785,664 | 11/1988 | Reebs | 73/290 V |

FOREIGN PATENT DOCUMENTS

| | | |
|---|---|---|
| 0152895 | 2/1985 | European Pat. Off. . |
| 430461 | 6/1926 | Fed. Rep. of Germany . |
| 3513270 | 10/1986 | Fed. Rep. of Germany . |
| 2138563A | 10/1984 | United Kingdom . |

OTHER PUBLICATIONS

Standard Search Report RS 80400 DE 7/18/88.
Radio Fernsenhen Elektronik, vol. 29, No. 2, 1980, pp. 74–75.
Electrical Design News, vol. 31, No. 7, (Apr. 1986).

*Primary Examiner*—Hezron E. Williams
*Assistant Examiner*—Louis M. Arana
*Attorney, Agent, or Firm*—Kenyon & Kenyon

[57] ABSTRACT

An apparatus for remote distance measurement varies the decay time of an electronic transducer to measure the distance to objects that are close to the transducer. The decay time for the amplitude of the oscillations of the transducer is varied by changing the transmitting frequency of the transducer since the rate at which the transducer oscillations decay depends on the transmitting frequency. The frequency is changed using a circuit comprising an electroacoustic transducer, a generator, a receiving amplifier and a control circuit. The generator generates an oscillation signal having a constant transmitting frequency and constant amplitude for a given transmitting time that depends on the distance of the object from the transducer. The transmitting frequency is chosen to measure the distance to a close object so that the transducer amplitude decays so fast that the echo signal can be received and evaluated without interference. The circuit for the remote distance measurement apparatus has particular application in motor vehicles.

4 Claims, 1 Drawing Sheet

APPARATUS FOR REMOTE DISTANCE MEASUREMENT

BACKGROUND OF THE INVENTION

The present invention relates to apparatus for making remote distance measurements that has particular applicability to motor vehicles. The invention uses at least one electroacoustic transducer to transmit an ultrasonic signal and to receive the ultrasonic signal reflected by an object. An electric generator is used to activate the transducer. A receiving stage is provided for the echo signals picked up by the transducer. A control unit uses the generator to activate the transducer for a predetermined transmission time. The transducer then decays for a time following its activation to provide a reception window for receiving the reflected echo signals.

Devices for remote distance measurement of the foregoing type are known from West German Patent 3,513,270. This reference describes an apparatus for measuring distance in which a control unit can vary the transmission time and/or the transmission power of the transducer. This reference further provides for making the time duration of the reception window smaller, as measured from the start of the transmitting time, for a cycle having a shorter transmitting time and/or a transducer having smaller transmitting power than for a cycle having a longer transmitting time and/or a transducer having a larger transmitting power. The voltage amplitude at the input of the transducer is varied which results in an equivalent change of the delay time when the attenuation of the transducer is kept constant. Reducing the voltage amplitude, however, decreases the useful signal at shorter object distances.

West German Patent No. 430,461, discloses a range o measuring method that uses reflected pulses from a mechanical transmitter. The transmitter has a resonance frequency that is slightly different than the resonance frequency of the receiver. The transmitter is driven at the resonance frequency of the receiver. The transmitter decays quickly once its energy supply is stopped. The frequency of the transducer then shifts away from the resonance frequency of the receiver. A switching pulse is thus generated having a well defined frequency and duration.

SUMMARY OF THE INVENTION

The present invention provides an apparatus for remote distance measurement in which the decay time of the transducer is variable and is therefore suitable for detecting objects that are near. The invention solves the problem mentioned above by using the generator to excite the transducer at a transmitting frequency that is chosen in such a way that the corresponding decay time of the transducer oscillation is shorter at shorter object distances than for longer distances.

The damping coefficient of the transducer oscillation can advantageously depend on the oscillation frequency. An appropriate choice of the transmitting frequency can make the decay time of the transducer smaller for shorter object distances than for longer distances. If the generator comprises a controlled oscillator and an output amplifier, the excitation of the transducer can be independent of the transmitting frequency at a constant voltage amplitude. The influence of the oscillation frequency on the decay time is utilized to advantage because the transmitting frequency corresponding to the resonance frequency of the converter increases when going to a shorter object distance. A transducer that oscillates at a higher frequency has a shorter decay time than at a lower frequency given a constant damping resistance.

DETAILED DESCRIPTION

Figure 1:
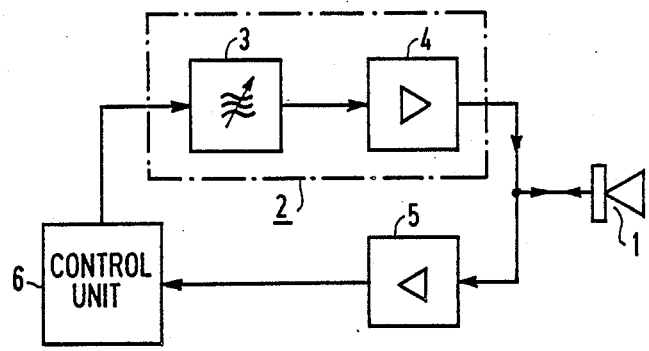
FIG. 1 shows a portion of a circuit for an apparatus for remote distance measurement according to the present invention.

A circuit for a remote distance measurement apparatus is shown in FIG. 1. The circuit comprises an electroacoustic transducer 1, a generator 2, a receiving amplifier 5 and a control unit 6. Generator 2, which comprises an oscillator 3 and a transmitting amplifier 4, receives a control signal from the control unit 6. Generator 2 excites the transducer 1 for a given constant transmitting time. The oscillation has a constant transmitting frequency and a constant voltage amplitude. The control signal of the control unit 6 sets the transmitting frequency of the generator 2. The oscillation of the generator 2 excites transducer 1 during the transmitting time. A decay time follows the transmission time. The transducer 1 freely oscillates during the decay time. The amplitude of the transducer oscillation decays at a rate that depends on the applicable damping coefficient. An echo follows the decay time during which the transducer 1 expects to receive the ultrasonic signal reflected by the object. If the transducer 1 receives this echo signal, it is passed on to the receiving amplifier 4 for amplification and fed from there to the control unit 6. The control unit 6 uses its evaluating circuit to determine the distance of the object from the time interval between the transmission of the ultrasonic signal and the reception of the echo signal.

The start of the reception window in which the echo signal is received can be shifted by varying the transmitting frequency set by the control unit 6 and by changing the decay time connected therewith depending on, for example, the object pickup. This processing is utilized to measure the object range when no echo signal is received during the reception window. This situation can happen, for example, if the transmitting frequency is chosen such that the decay time is too long and the transducer 1 thereby receives the echo signal reflected by a near object during the decay of the transducer amplitude (see FIG. 2). The transmitting frequency must then change so that the decay time is shorter and the reception window starts sooner.

The processing steps executed by control unit 6 can readily be realized with a microprocessor that executes an appropriate control program. The program instructs the microprocessor to release the transmitting amplifier 4 during the transmitting time so that transmitter 1 releases transducer 1. The program then evaluates the decay signals received by amplifier 5 during the subsequent decay time and, if necessary, changes the transmitter frequency with respect to the resonance frequency of the transducer to compensate for a short object distance. The selection of an appropriate microprocessor and the creation of an appropriate program are ordinary development steps that are within the level of skill of one skilled in the art and therefore not described further.

Figure 2:
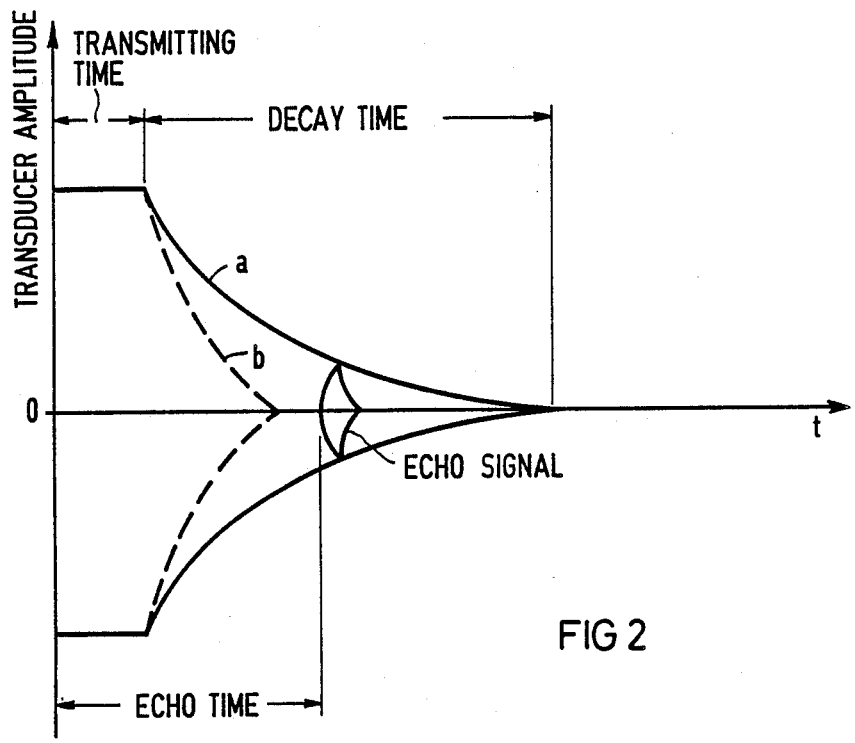
FIG. 2 shows the decay behavior of the amplitude of a transducer.

FIG. 2 shows a decay envelope 2 for the transducer amplitude in which the echo time is smaller than the sum of the transmitting time and the decay time. The echo signal is consequently obscured by the decaying transducer amplitude and cannot be evaluated. If the decaying amplitude has envelope b, the associated decay time can be shortened by changing the transmitting frequency to produce a larger damping coefficient. The echo signal can then be received and evaluated with accuracy.

What is claimed is:

1. An apparatus for remote distance measurement, especially for motor vehicles, comprising:
   at least one electroacoustic transducer for transmitting an ultrasonic signal and for subsequently receiving an ultrasonic echo signal reflected by an object;
   an electric generator for activating the transducer at a transmission frequency;
   a receiving stage for the echo signals received by the transducer; and
   a control unit for activating the generator for a transmission time and for providing a subsequent decay time for the transducer to subsequently form a reception window for receiving reflected echo signals, the control unit further comprising means for selecting a transmission frequency at which the generator activates the transducer and for adjusting the transmission frequency for short object distances to make the decay time of the transducer oscillation less than for larger distances.

2. An apparatus for remote distance measurement as claimed in claim 1, wherein the control unit further comprises means for increasing the transmission frequency of the transducer when the object is at a shorter distance.

3. An apparatus for remote distance measurement as claimed in claim 1, wherein the generator comprises a controlled oscillator and a transmitting amplifier.

4. An apparatus for remote distance measurement as claimed in claim 3, wherein the control unit further comprises means for increasing the transmission frequency of the transducer above its resonance frequency when the object is at a shorter distance.

* * * * *